United States Patent [19]
Morley

[11] Patent Number: 5,881,678
[45] Date of Patent: Mar. 16, 1999

[54] INSULATED COVER FOR A PORTABLE DOG KENNEL

[76] Inventor: Patrick R. Morley, 3525 Glen Arbor, St. Louis, Mo. 63125

[21] Appl. No.: 884,742

[22] Filed: Jun. 30, 1997

[51] Int. Cl.⁶ ................................................ A01K 1/03
[52] U.S. Cl. ................................................. 119/496
[58] Field of Search ..................... 119/452, 453, 119/459, 461, 467, 469, 470, 471, 482, 489, 491, 496–498

[56] References Cited

U.S. PATENT DOCUMENTS

| | | | |
|---|---|---|---|
| 998,462 | 2/1911 | Burch | 119/498 |
| 3,547,079 | 12/1970 | Bassett | 119/497 |
| 5,072,694 | 12/1991 | Haynes et al. | 119/482 |
| 5,078,096 | 1/1992 | Bishop | 119/497 |
| 5,170,745 | 12/1992 | Burdette, Jr. | 119/497 |
| 5,277,148 | 1/1994 | Rossignol et al. | 119/453 |
| 5,671,698 | 9/1997 | Farrugia | 119/497 |

OTHER PUBLICATIONS

Dunns catalog, Spring, 1995, p. 82 "Lazy Pet" catalog page with product codes, crate models, UPC codes.

"Show Insert #U95–0035" advertising page showing crate cover with Nos. and costs.

*Primary Examiner*—Thomas Price
*Attorney, Agent, or Firm*—Polster, Lieder, Woodruff & Lucchesi

[57] ABSTRACT

A fabric cover is provided for a portable dog kennel. Preferably, the cover is made from an insulative fabric having a camouflage pattern formed on its outer surface. The cover has a top, side, a front, a back, and a bottom. A doorway formed in the front of the cover to allow a dog to enter and exit the carrier and a door flap is provided to close the doorway. A window is formed in the sides of the cover to expose the vents of the kennel when applied to the kennel, and a window flap sized to close the window. The door of the cover is rollable and the cover includes fasteners to hold the door in an open position. Similarly, the window flap may be secured in an opened position and in a closed position. Side pockets are provided beneath the windows. Preferably, the window flaps are sufficiently long to cover or close the pockets when the flaps are down. The cover can also be provided with a mesh pocket and a clear document pocket.

26 Claims, 13 Drawing Sheets

5,881,678

INSULATED COVER FOR A PORTABLE DOG KENNEL

CROSS-REFERENCE TO RELATED APPLICATIONS

This application is related to Disclosure Document Number 379,751 which was filed on Aug. 11, 1995, and to design application Ser. Nos. 29/073,013 and 29/073,016, both entitled DOG KENNEL COVER, filed Jun. 27, 1997, and which are incorporated herein by reference.

STATEMENT REGARDING FEDERALLY SPONSORED RESEARCH OR DEVELOPMENT

Not Applicable.

BACKGROUND OF THE INVENTION

This invention relates to covers for portable dog kennels, and in particular to an insulated cover having a camouflage pattern which may be used by hunters for their dogs.

Hunters typically will take one or more dogs with them when they hunt. When a hunt occurs in the winter, the dogs can get very cold, and may have no place to warm up when they are not working. This is especially true, if the dogs will be sleeping outdoors overnight.

Portable kennels can be used to hold the dogs when they are not working. However, such kennels are not insulated, and in fact have doors and windows which will allow the air to pass through the kennel. Thus, the kennels will not keep the hunting dogs warm. Further, the kennels are highly visible and may easily be seen by the game being hunted. The game may therefore stay away from the hunter's position, having been effectively warned of their presence.

BRIEF SUMMARY OF THE INVENTION

One object of this invention is to provide a kennel cover for portable kennels.

Another object is to provide such a cover which is insulated.

A third object is to provide such a cover which allows for the door and windows of the kennel to be closed.

A fourth object is to provide such a cover which includes door flaps and window flaps to close the door and vents of the kennel.

A fifth object is to provide such a cover which has a camouflage pattern printed on its outer surface.

A further object is to provide such a cover which includes pockets for holding various items.

These objects will become apparent to those skilled in the art in light of the following description and accompanying drawings.

Briefly, a typical portable kennel is made either of wire or of molded plastic, and as noted, includes a wire door through which a dog can enter and exit the kennel and air vents to allow air to circulate through the kennel. A fabric cover is provided for the kennel. Preferably, the cover is made from a water resistant, insulative fabric and preferably, the cover has a camouflage pattern formed on its outer surface. The cover has a top, side, a front, a back, and a bottom. A doorway formed in the front of the cover to allow a dog to enter and exit the carrier and a door flap is provided to close the doorway. A window is formed in the sides of the cover to expose the vents of the kennel when applied to the kennel, and a window flap sized to close the window. The bottom of the cover is opened to make it easier to fit the cover over the kennel. The cover includes a strip of material positioned under the kennel when the cover is fitted over the kennel to secure the cover to the kennel. The strip of material extends along the sides and back of the cover to extend inwardly from a base of the sides and back of the cover when the cover is fitted over the kennel. A channel is formed at the inner edge of the strip of material and an elastic strip extends through the channel. The elastic draws the strip tight to secure the cover to the carrier. The cover may also be provided with a strip of material which extends between opposed sides of the cover. This strip is fixed at one end to one side of the cover and removably connected to an opposing side of the cover. Further, loops are provided on opposite sides of the cover at the bottom of the sides. A cord extends between the two loops to help secure the cover to the kennel.

The door flap of the cover is rollable and the cover includes fasteners to hold the door flap in an open position. Preferably, the cover includes an outer door strap secured to an outer surface of the cover front and an inner door strap secured to an inner surface of the cover front. The straps preferably are provided with mating buckle halves at their ends to secure the inner and outer straps together and hold the door flap opened.

The cover is also provided with upper and lower window fasteners to hold the window flap opened or closed. These fasteners include a first fastener half on the window flap and second fastener halves positioned on the outer surface of the cover. One fastener half is mounted to the cover above the window to hold the window flap opened and another fastener half is mounted to the cover below the window to hold the window flap closed. Preferably, the window fasteners are hook-and-pile fasteners, such as VELCRO® fasteners.

A pocket can be provided on the sides of the cover below the window. The pocket is closed along its sides and bottom and opened at its top. Preferably, the window flap is sufficiently long to close the top of the pocket when the window flap is down.

The cover can also be provided with a mesh pocket and a clear document pocket.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

A kennel cover 1 is provided for a portable kennel 3. As is typical, the kennel 3 has a bottom, top, sides, a front, and a back. A wire door 5 is formed at the front of the kennel, and vents 7 are formed in the sides of the kennel. As is also typical, the kennel 3 is made of molded plastic, the kennel door 5 is not a solid door, and the vents cannot be closed. Thus, there is no way to protect a dog housed in the kennel from the elements.

Figure 13:
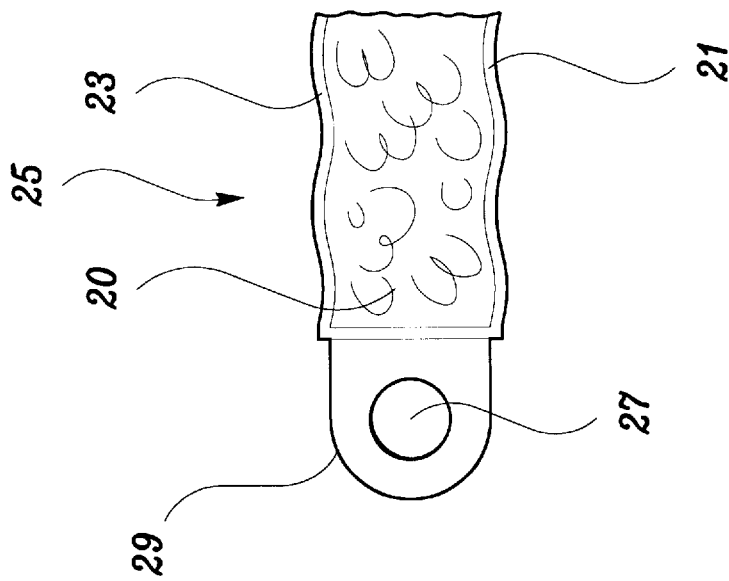
FIG. 13 is a cross-sectional view through the material of the kennel cover taken along line 13—13 of FIG. 3.
Figure 12:
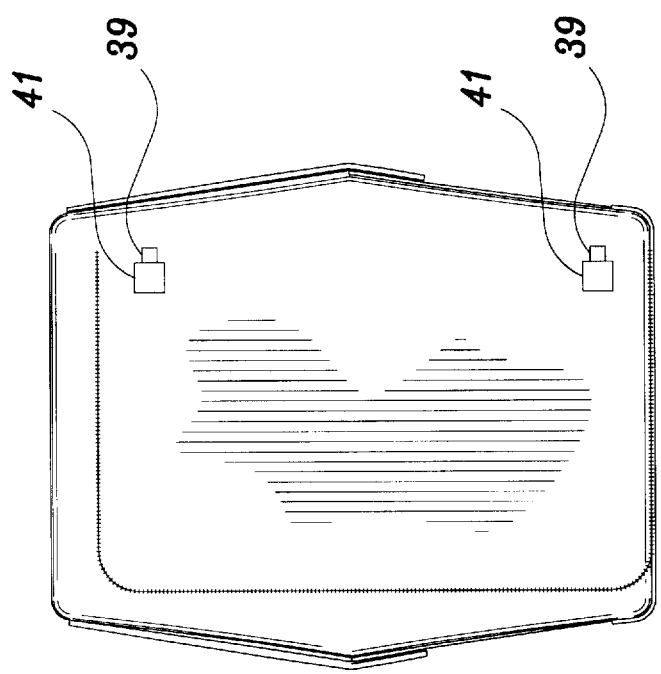
FIG. 12 is a front elevational view of the kennel cover with the door flap and window flaps closed.
Figure 15:
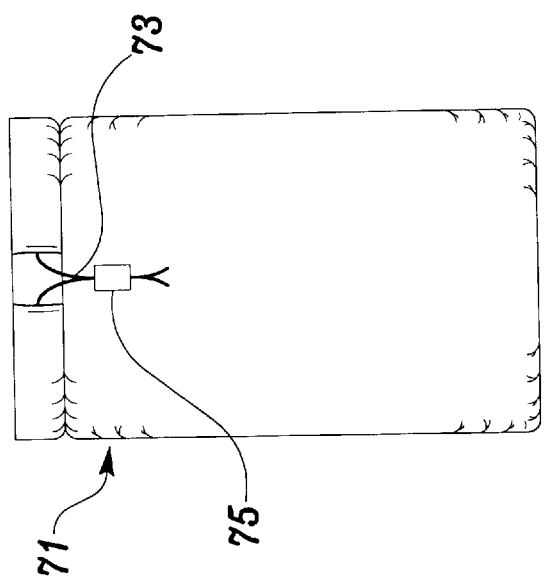
FIG. 15 is a view of a tote bag for the kennel cover.

The kennel cover 1 is provided to cover the kennel and is sized to fit most commercially available portable kennels. The cover 1 includes a front 11, sides 13, a back 15, a top 17, and a bottom 19 which is essentially open. The kennel cover 1 is formed of a heavy duty water resistant fabric that preferably contains a sandwiched insulation material 20 therein. As seen in FIG. 13, the fabric of the kennel cover 1 has an inner surface 21 and outer surface 23 between which the insulation material 20 is sandwiched.

Figure 3:
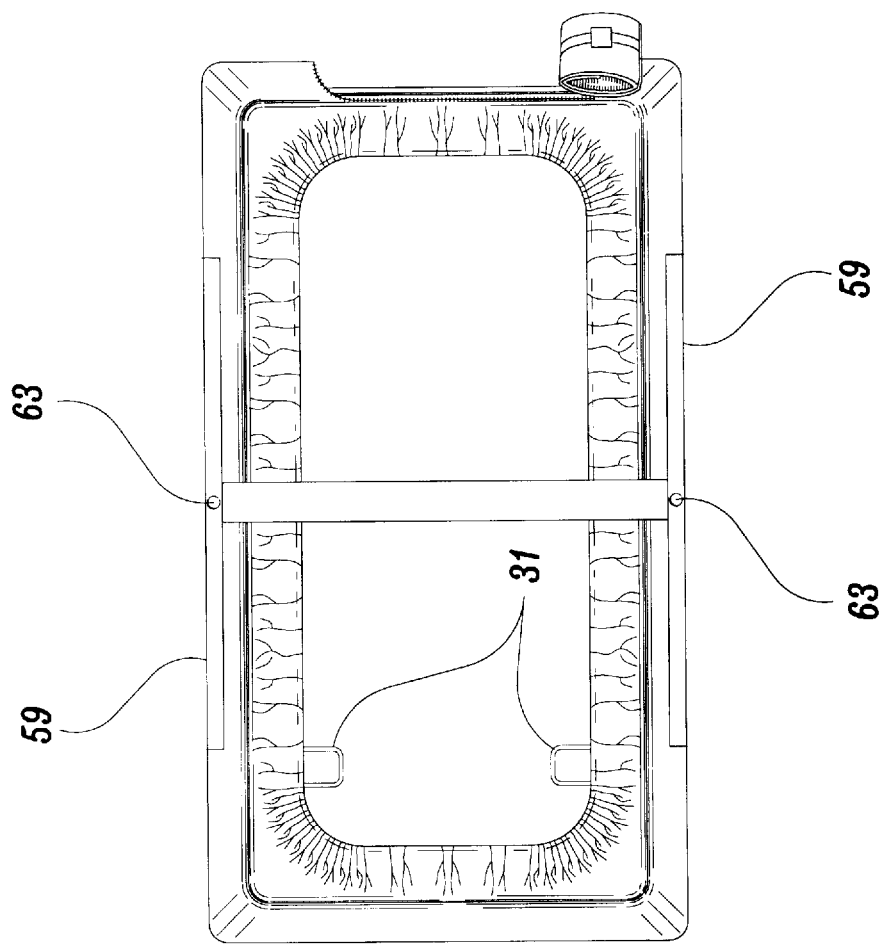
FIG. 3 is a bottom plan view of the kennel cover with the door flap opened.
Figure 4:
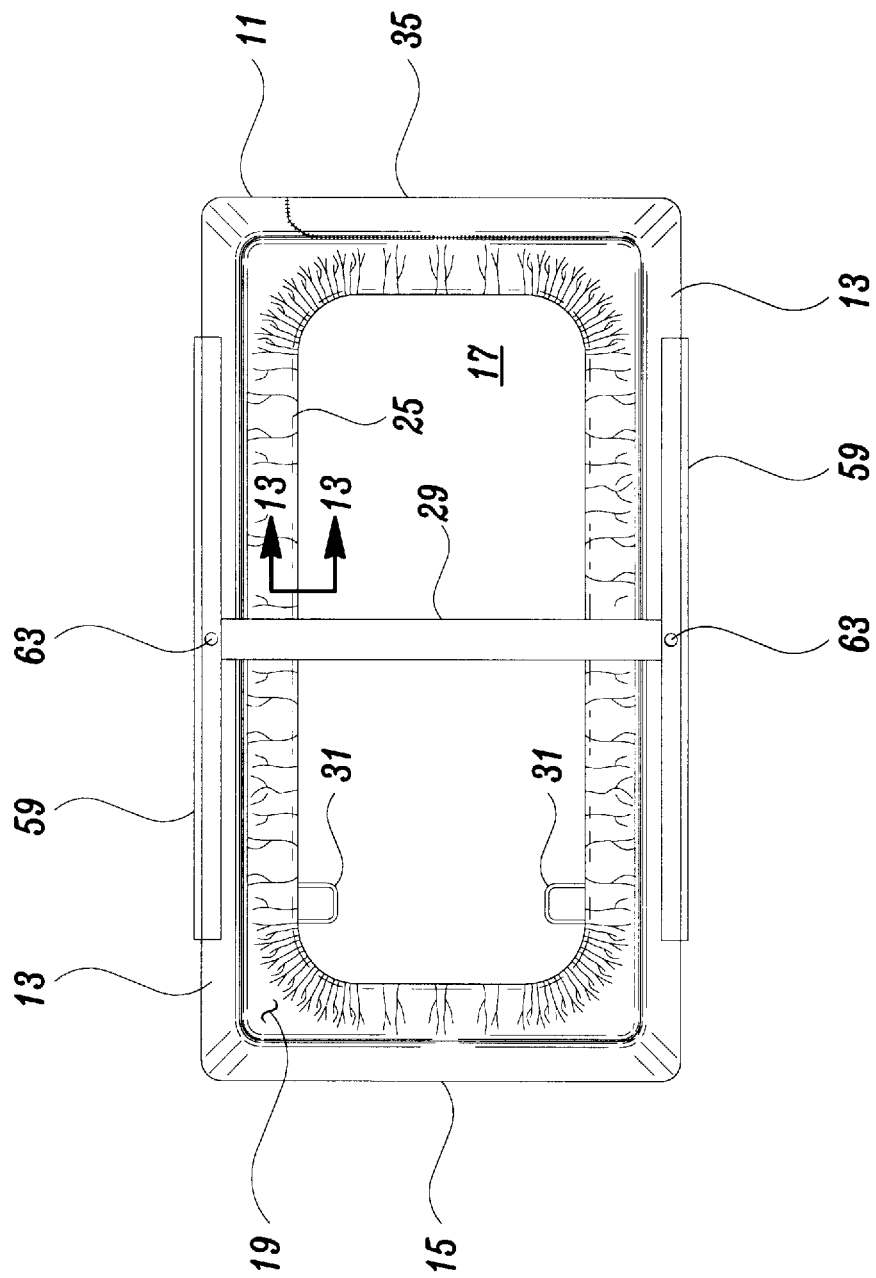
FIG. 4 is an is a bottom plan view of the kennel cover with the door flap closed.
Figure 5:
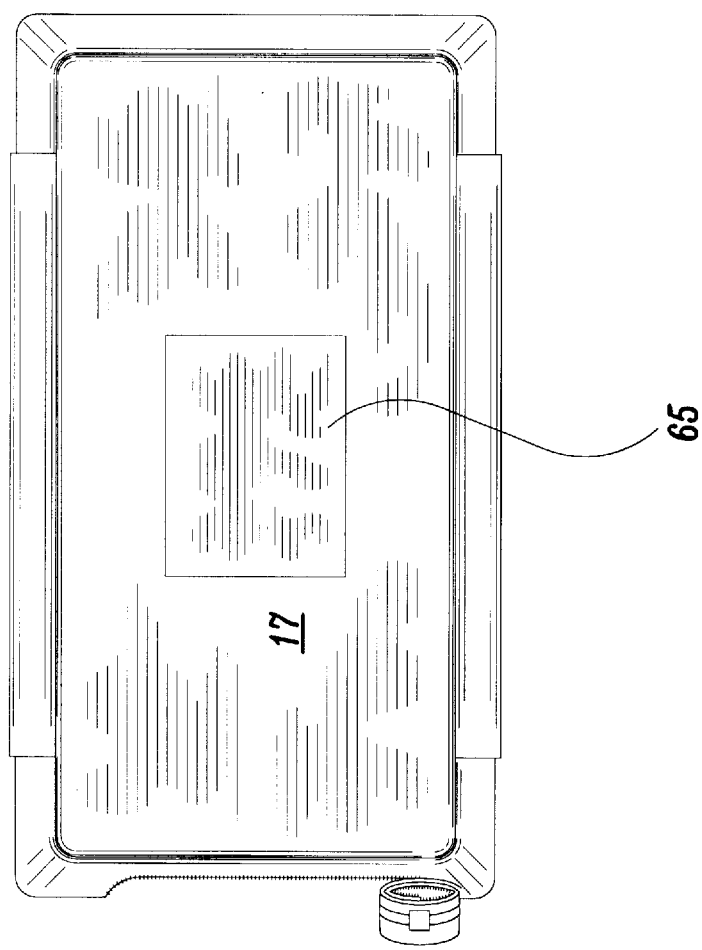
FIG. 5 is a top plan view of the kennel cover with the door flap and window flaps opened.
Figure 6:
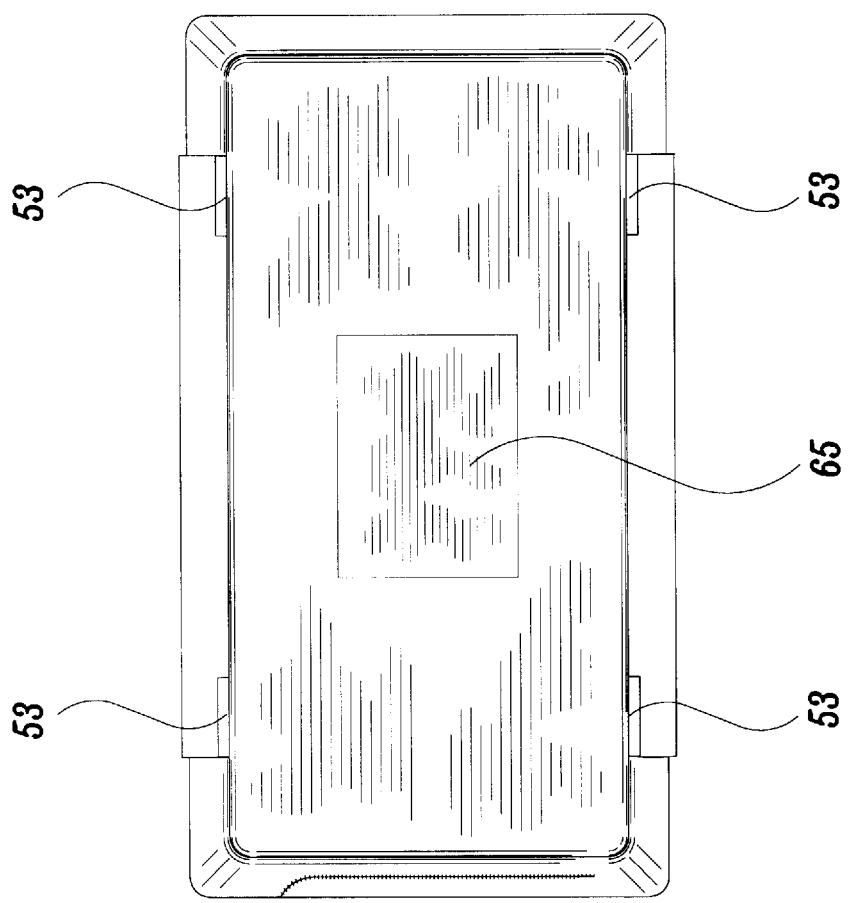
FIG. 6 is a top plan view of the kennel cover with the door flap and the window flaps closed.
Figure 7:
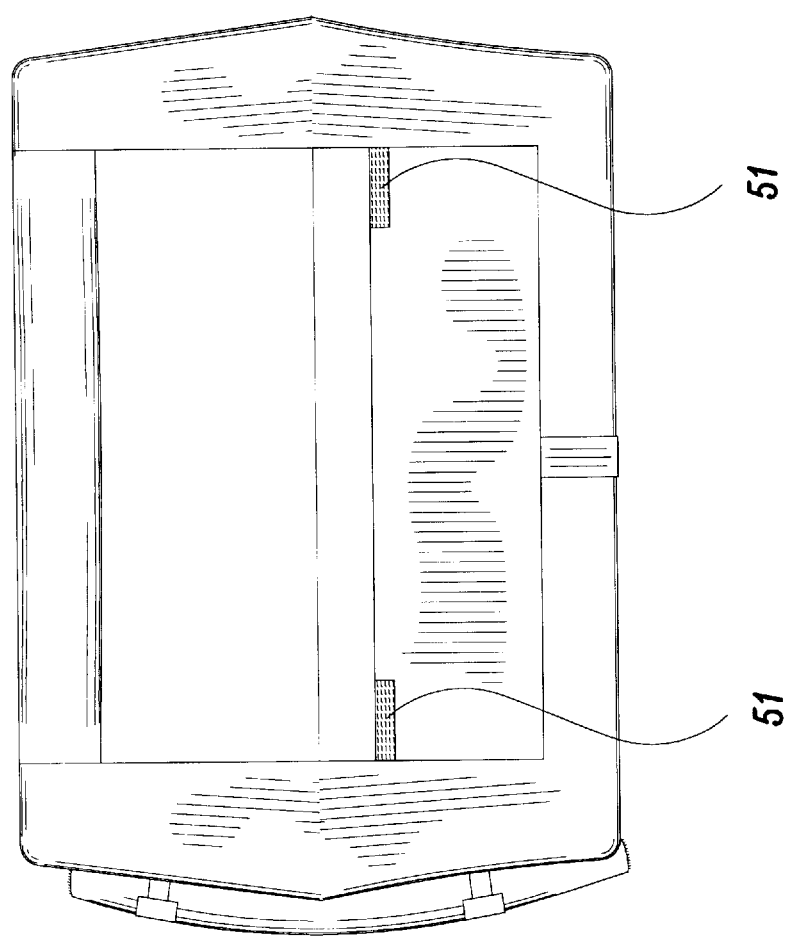
FIG. 7 is a side elevational view of the kennel cover with the door flap and window flaps opened.
Figure 8:
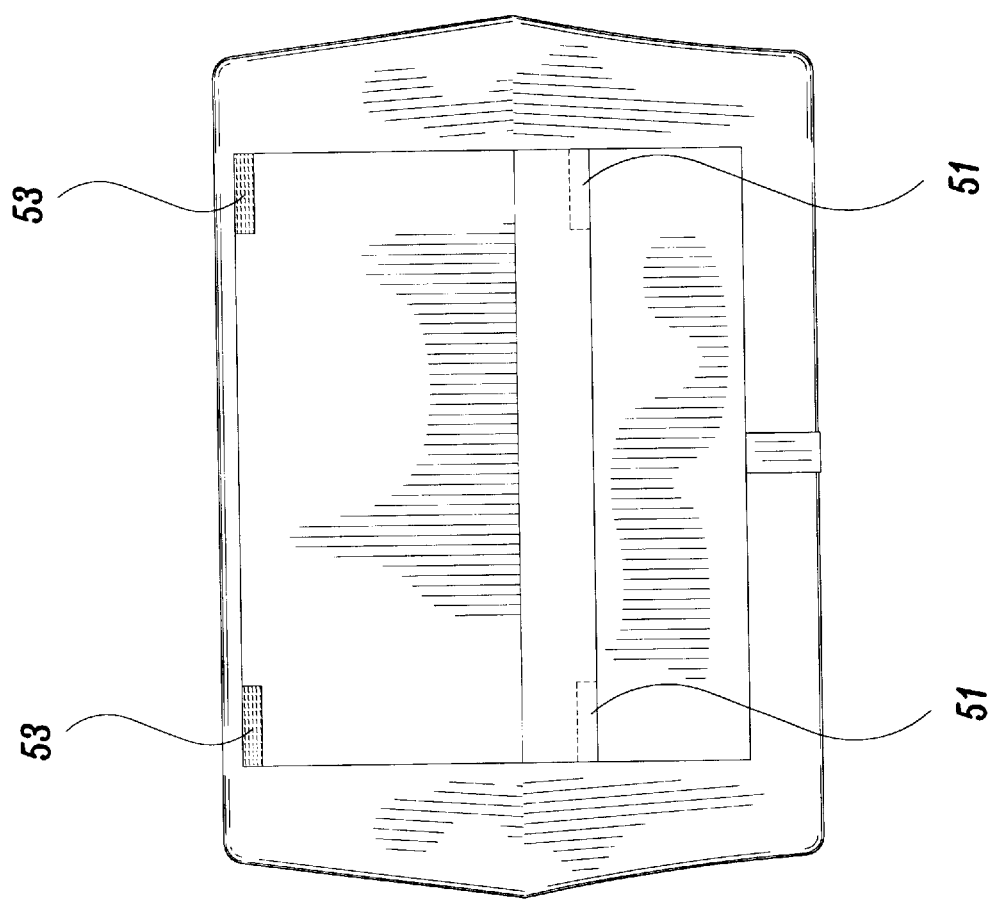
FIG. 8 is a side elevational view of the kennel cover with the door flap and window flaps closed.
Figure 9:
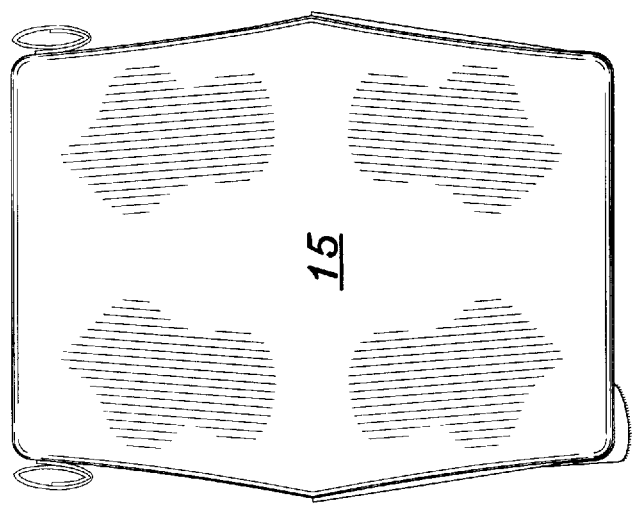
FIG. 9 is a rear elevational view of the kennel cover with the window flaps opened.
Figure 10:
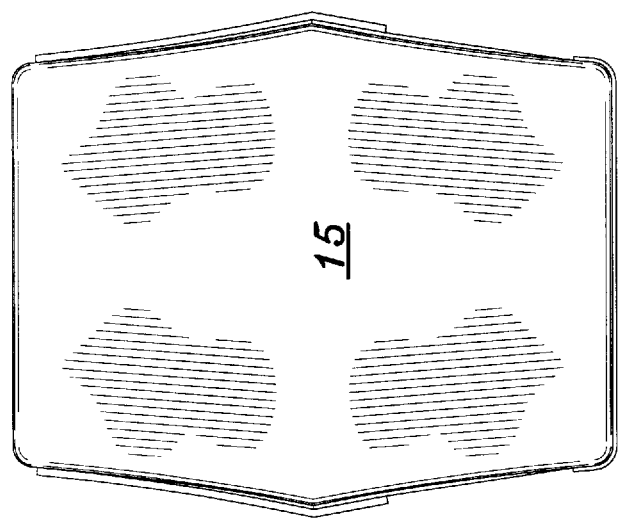
FIG. 10 is a rear elevational view of the kennel cover with the window flaps closed.
Figure 11:
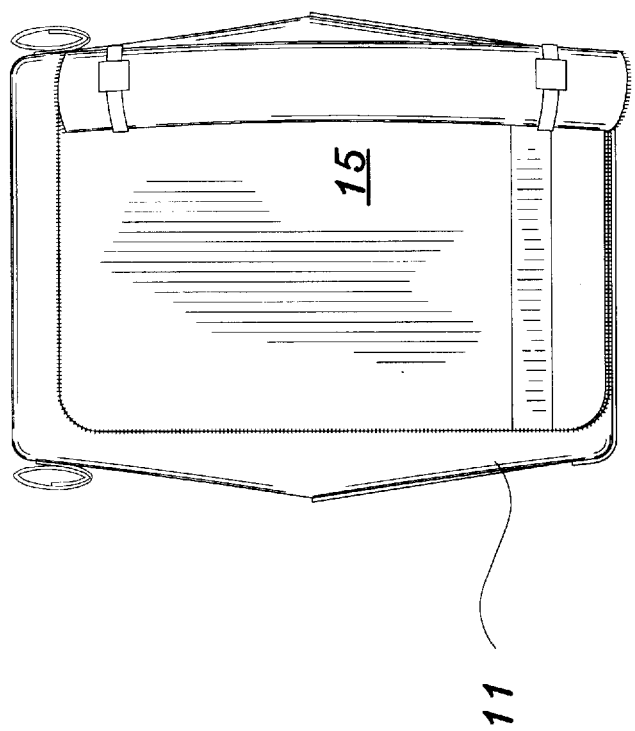
FIG. 11 is a front elevational view of the kennel cover with the door flap and window flaps opened.

The bottom 19 of the kennel cover 1 is opened (as best seen in FIGS. 3 and 4) to make it easier to fit the cover 1 to the kennel 3. To hold the kennel cover 1 in place on the kennel, the back and sides of the kennel cover extend under the kennel to form a strip of material 25 which extends at least around the back and sides of the kennel cover 1 and which is received under the bottom of the kennel when the cover 1 is in place. An elastic shock cord 27 (FIG. 13) extends through a channel 29 formed at the edge of the strip 25. The elastic band 27 will stretch when the cover 1 is applied to the kennel 3 to hold the strip 25 under the kennel. A strip of webbing 29 is also provided to extend between the sides 13 approximately along the middle of the sides 13. The webbing 29 is fixed to one of the sides 13 and removably attached to the other side using a hook and pile fastener such as VELCRO® fastener. Also provided are a pair of oppositely positioned fabric loops 31 through which a rope (not shown), for example, can be threaded to further secure the cover 1 to the kennel 3. The strip 25, which is tightened by the elastic band 27, is sufficient to hold the carrier to the kennel. Thus, the cord 29 and the fabric loops 31 can be omitted if desired.

Figure 1:
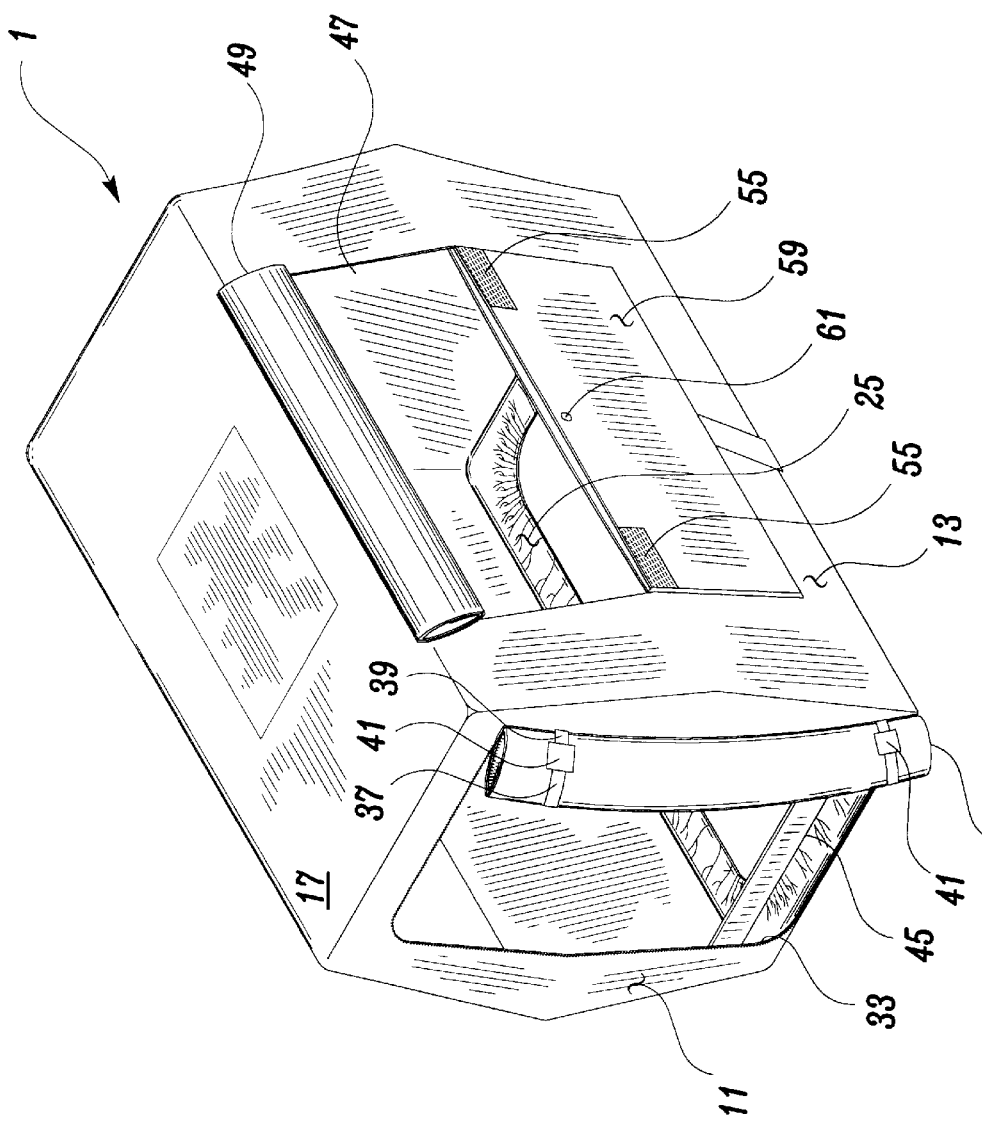
FIG. 1 is a perspective view of a cover of the present invention for use with a standard portable dog kennel or carrier, the cover being shown with a door flap and window flap opened.
Figure 2:
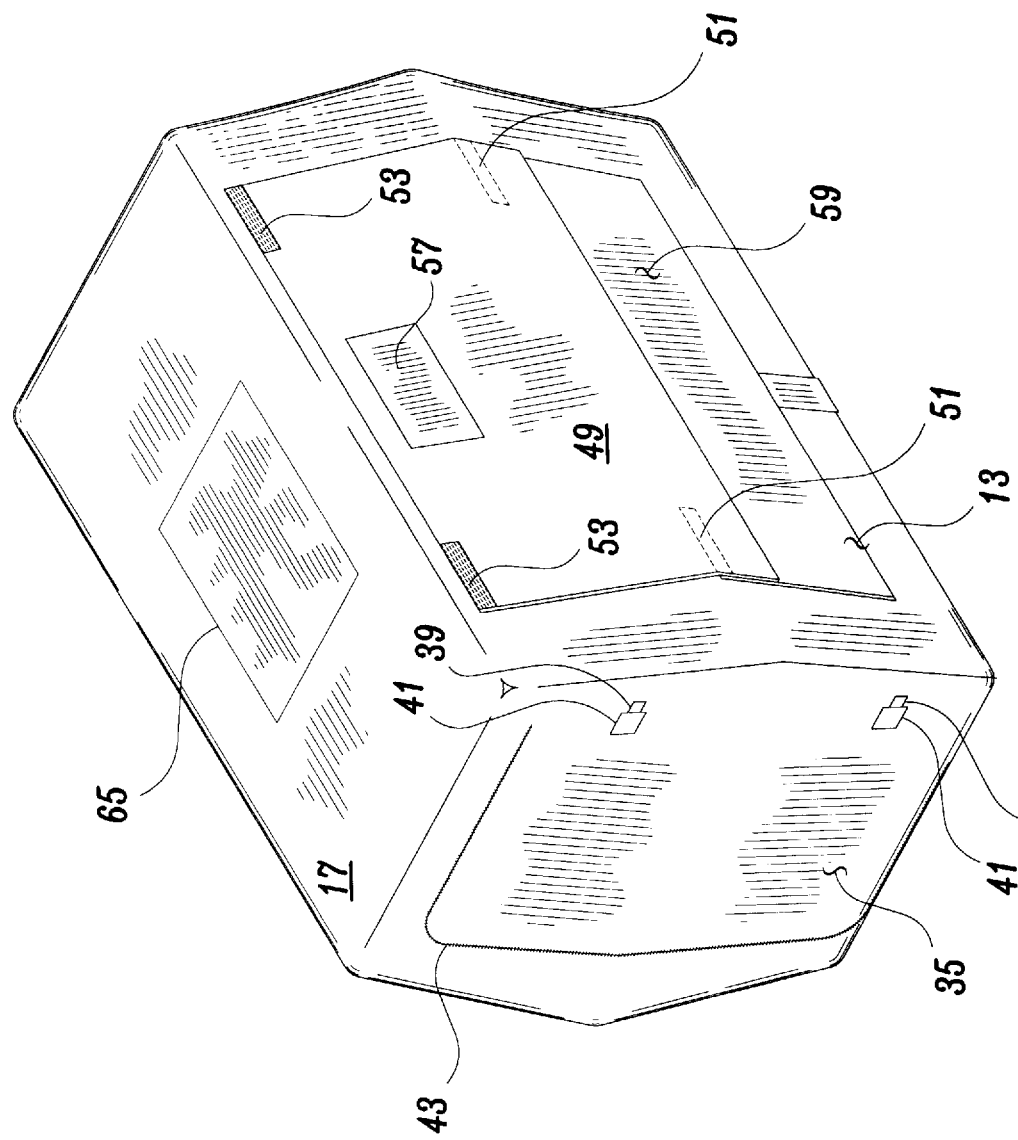
FIG. 2 is a perspective view of the cover with the door flap and window flaps closed.

A doorway 33 is provided in the cover front 11. The doorway 33 is closed with a door flap 35. The door flap 35 is rollable, and can be rolled up, as shown in FIG. 1. The doorway 33 and door flap 35 are positioned, shaped, and sized to facilitate the use of kennel doors which are hinged on either of the left and right sides of the door. This will allow the kennel to be used in an upside down position, as is sometimes done to position the air vents 7 at a lower position. To hold the door flap 35 opened, an inner strap 37 and outer strap 39 are provided. The straps 37 and 39 are secured together, for example by mating halves of a clip or buckle 41, to hold the door flap 35 in its rolled up and opened position. Alternatively, the door flap 35 can be held open simply by tying the straps 37 and 39 together. The inner strap 37 is fixed to the inner surface of the cover front 11 essentially at the base of the door flap 35 (i.e., where the door flap 35 joins or is connected to the cover front 11). The outer strap 39 is positioned essentially at the base of the door flap 35 on the outer surface of the cover front 11. Preferably there are two pair of straps provided: one near the top of the door flap and another near the bottom of the door flap. A zipper 43 (as shown in FIG. 2) is used to close the door flap. The door flap 35 alternatively may be closed with hook-and-pile fasteners, clips, buckles, snaps, clasps, or any other type of conventional fastener which will hold the door flap 35 closed.

To further facilitate holding the kennel cover 1 to the kennel 3, a second strip of webbing 45 extends across the doorway 33 near the bottom of the doorway. As with strap 29, the webbing strip 45 is fixed to one side of the cover and removably attachable to the other side of the cover, for example, with a VELCRO® fastener.

Figure 14:
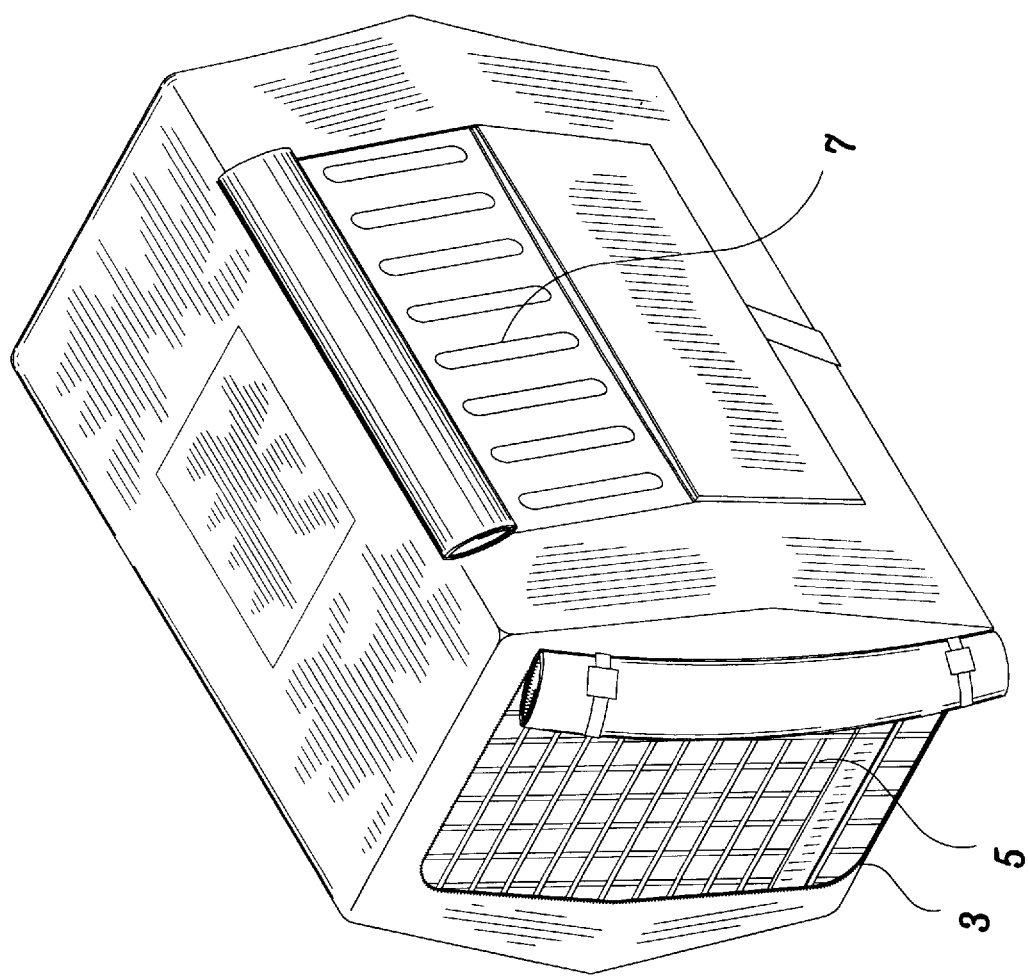
FIG. 14 is a perspective view of the kennel cover applied to a portable kennel.

The sides 13 of the cover 1 are provided with windows 47 which are positioned to be adjacent the vents 7 of the kennel 3 when the cover is fitted over the kennel, as seen in FIG. 14. The window 47 is sized to accommodate most commercially available portable kennels. The window 47 is closed with a flap 49. Preferably, for purposes explained below, the window flap 49 has a length greater than the window 47. The window flap is held opened and secured closed by hook and pile fasteners. Other means, such as snaps or zippers, hook-and-pile fasteners, buckles, clasps, etc., can be used to hold the window flap 49 opened. One portion of the fastener, for example the pile portion, is secured to the inner surface of the window flap 49. Preferably, two strips 51 of the pile portion are fixed to the window flap 49 near the edges of the flap above the bottom of the flap. One set of corresponding strips 53 of the hook portion of the fastener is secured to the outer surface of the side 13 above the window. The positioning of the pile portions 51 and the hook portions 53 allow for the flap 49 to be rolled up to open the window 49, and expose the vents 7 of the kennel 3. A second set of hook portions 55 are provided below the window to hold the window flap closed. Any other conventional means can be used to hold the window flap closed.

A mesh pocket 57 is provided on the window flap 49. The pocket 57 is sized to hold items such as deodorizers, for example. The deodorizer hides the odor of the dog, especially when the dog is being transported in an enclosed area, such as in a car, truck or van.

A pocket 59 is provided on each side 13 of the carrier below the window 47. The pocket is has a length approximately equal to that of the window and is closed on its sides and bottom, and opened along its top. A snap 61 is provided in the middle of the pocket 59 near the top of the pocket to at least partially close the pocket. The pocket 59 is preferably a deep pocket, and may be used to hold items for the dog, for hunting or even small game which have been killed. A hole 63 is provided in the bottom of the pocket 59 to allow the pocket to be cleaned. The pocket can be flushed, and the water will then drain out the hole 63 in the bottom of the pocket 59. As noted above, the window flap 49 is longer than the window 47. Preferably, the window flap 49 is sized to cover the top of the pocket 59, so that when the window is closed, the pocket 59 will be closed and the contents of the pocket will not be subject to damage from rain, etc. The top 17 of the cover 1 is provided with a clear vinyl pocket 65. The pocket 65 is sized to hold documentation, for example shipping papers which may be needed to transport a dog in the carrier, via airline, railroad, etc.

When in place, the cover 1 fits snugly about the kennel 3. The insulating properties of the cover 1 prevents the dog's natural body heat from escaping from the kennel 3, enabling the dog to keep warm in the kennel when the door flap 35 and window flaps 49 are closed. The dog will even be able to warm up some during the day when it is not working if the window flaps 49 are closed, even when the door flap 35 is opened. Further, because the cover has a camouflage pattern, the cover cannot easily be seen, even when in the open. Thus, the game will not easily see the kennel, and thus will not be alerted to the presence of the hunter or the hunting dog. Further, depending on the construction of the kennel vents 7, the dog can push against the window flaps 49 with its nose to allow fresh air into the kennel 3, and thus, the window flaps 49 can be kept closed on a more regular basis.

To facilitate transport of the cover 1, a tote bag 71 is supplied. The tote bag is sized to accept the cover 1 when the cover is folded or rolled up. The tote bag is preferably cylindrical, closed at one end and opened at the other. The opened end of the tote bag 71 is provided with a draw string 73 which can be used to at least partially close the open end of the bag. The draw string 73 is located in a channel formed at the top of the bag 71 A draw string lock 75 is provided to secure the bag in the closed position.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. Although one strip of webbing 29 is provided at the bottom 19 of the cover 1 along with the fabric loops 31, the strip of webbing 29 can be replaced with a second pair of fabric loops. Alternatively, the fabric loops 31 can be replaced with a second strip of webbing. The location of the strip of webbing 29 can also be changed if desired. If desired, the pockets 59 can be eliminated. These examples are merely illustrative.

I claim:

1. In combination, a portable dog kennel and a fabric cover for the portable dog kennel, the kennel having a front wall, a back wall, side walls, a top, a bottom, a in one of the kennel side walls for circulating air through the kennel; the cover being sized to fit over the kennel and including a top, a front sides, a back, and an opened bottom; the cover having a door opening in the front, the door opening extending upwardly from the opened bottom of the cover and being positioned to be adjacent the kennel door when the cover is fitted over the kennel, a door flap sized to close the door opening; a fastener for maintaining the door flap in a closed position and a fastener for maintaining the door flap in an open position, a window opening in a side portion of the cover positioned to be adjacent the kennel vent when the cover is fitted over the kennel; a widow flap sized to close the window opening, the window flap being selectively moved between a first position in which the flap covers the window opening and a second position in which the flap closes the window opening; and a fastener for maintaining the window flap in one of the first and second positions; and elastic extending between opposite sides of the cover and under the kennel bottom to hold the cover to the kennel.

2. The combination of claim 1 wherein said fastener for holding said door flap closed comprises a zipper.

3. The combination of claim 1 wherein said fastener for holding said door flap opened comprises an outer door strap secured to an outer surface of said cover front portion and an inner door strap secured to an inner surface of said cover front; said inner and outer straps being connectable to each other to hold the door opened.

4. The combination of claim 3 wherein said inner and outer door straps have free ends; said cover including mating fastener halves at said free ends to connect said inner and outer door straps together.

5. The combination of claim 1 wherein the window flap is positioned above the window opening.

6. The combination of claim 1 wherein the cover includes a strip of material positioned under the kennel when the cover is fitted over the kennel to secure the cover to the kennel.

7. The combination of claim 1 including a pocket on a side portion of the cover.

8. The combination of claim 1 wherein the cover includes a strip of webbing extendible between opposite sides of the cover door opening near the bottom of the door opening.

9. A cover for a portable pet kennel, the kennel having a door through which a pet can enter and leave the kennel and vents for circulating air through the kennel; the cover having an opened bottom and being sized to fit over the kennel; the cover having a door flap formed in a front portion of the cover, the door flap being positioned to be adjacent the kennel door when the cover is fitted over the kennel; the cover including a fastener for maintaining the door flap in a closed position, a fastener for maintaining the door flap in an open position, and a strip of material positioned under the kennel when the cover is fitted over the kennel to secure the cover to the kennel; the strip of material extending along the sides and back of the cover to extend inwardly from a base of the sides and back of the cover when the cover is applied to the kennel; the strip having a inner edge, a channel formed at said inner edge; said cover including an elastic strip extending through said channel and being secured at one end to a first end of said channel and at a second end to a second end of said channel.

10. A cover for a portable dog kennel, the kennel having a door through which a dog can enter and leave the kennel and vents for circulating air through the kennel; the cover having an opened bottom and being sized to fit over the kennel; the cover having a door flap formed in a front portion of the cover, the door flap being positioned to be adjacent the kennel door when the cover is fitted over the kennel; the cover including a fastener for maintaining the door flap in a closed position, a fastener for maintaining the door flap in an open position, and a strip of material positioned under the kennel when the cover is fitted over the kennel to secure the cover to the kennel; said strip of material extending between said sides of said cover.

11. The cover of claim 10 wherein a first end of said strip is fixed to one side of said cover at a bottom of said side, a second end of said strip being removably connectable to an opposing side of said cover.

12. A cover for a portable dog kennel, the kennel having a door through which a dog can enter and leave the kennel and vents for circulating air through the kennel; the cover having an opened bottom and being sized to fit over the kennel; the cover having a door flap formed in a front portion of the cover, the door flap being positioned to be adjacent the kennel door when the cover is fitted over the kennel; the cover including a fastener for maintaining the door flap in a closed position, a fastener for maintaining the door flap in an open position, a strip of material positioned under the kennel when the cover is fitted over the kennel to secure the cover to the kennel, and a pair of loops mounted to opposing sides of said cover at a bottom of said sides, said strip of material comprising a cord which extends between and is secured to said loops.

13. A cover for a portable dog kennel, the kennel having a door through which a dog can enter and leave the kennel and vents for circulating air through the kennel; the cover being sized to fit over the kennel; the cover having a side portion; a pocket on the side portion; a door flap formed in a front portion of the cover, the door flap being positioned to be adjacent the kennel door when the cover is fitted over the kennel; a fastener for maintaining the door flap in a closed position and a fastener for maintaining the door flap in an open position; a window positioned to be adjacent a vent of the kennel when the cover is fitted over the kennel; and a window flap which closes the window; the cover pocket being positioned beneath the cover window, the window flap being sufficiently long to close the top of the pocket when the window flap is down.

14. The cover of claim 13 wherein said cover includes a window fastener for maintaining said window flap opened.

15. The cover of claim 14 wherein said window fastener includes a first fastener half on said window flap and a second fastener half on an outer surface of said cover side portion above said window; said fastener halves being matable with each other to hold said window flap in an opened position.

16. The cover of claim 15 wherein said cover includes a window fastener for maintaining said window flap closed, said window fastener including a fastener half positioned below the window which is matable with the fastener half on the window flap.

17. The cover of claim 16 wherein the window fasteners include hook and pile fasteners.

18. The cover of claim 13 wherein the outer surface of the cover has a camouflage pattern formed thereon.

19. The cover of claim 13 wherein said pocket includes an opening in a bottom of said pocket.

20. The cover of claim 13 including a mesh pocket.

21. The cover of claim 20 wherein the document pocket is clear.

22. The cover of claim 13 including a document pocket sized to hold documents.

23. A cover for a portable dog kennel, the kennel having a door through which a dog can enter and leave the kennel and vents for circulating air through the kennel; the cover being sized to fit over the kennel; the cover being made of fabric; the cover having:

a door flap formed in a front portion of the cover, the door flap being positioned to be adjacent the kennel door when the cover is fitted over the kennel;

a fastener for maintaining the door flap in a closed position and a fastener for maintaining the door flap in an open position;

a window in a side portion of the cover to expose the vents of the kennel when the cover is fitted over the kennel to the kennel;

a window flap sized to close the cover window;

a window flap fastener positioned to hold the window flap in an opened position; and a pocket positioned beneath the cover window the window flap being sufficiently long to close the top of the pocket when the window flap is down.

24. The cover of claim 23 wherein said fastener for holding said door flap opened comprises an outer door strap secured to an outer surface of said cover front portion and an inner door strap secured to an inner surface of said cover front portion; said inner and outer straps being connectable to each other to hold the door opened.

25. The cover of claim 23 wherein said window fastener includes a first fastener half on said window flap and a second fastener half on an outer surface of said cover side above said window; said fastener halves being matable with each other to hold said window flap in an opened position.

26. The cover of claim 23 wherein the cover has an opened bottom, the cover including a strip of material positioned under the kennel when the cover is fitted over the kennel to secure the cover to the kennel; the strip of material extending along the sides and back of the cover to extend inwardly from a base of the sides and back of the cover when the cover is applied to the kennel; the strip having an inner edge, a channel formed at said inner edge; said cover including an elastic strip extending through said channel and being secured at one end to a first end of said channel and at a second end to a second end of said channel.

* * * * *